(12) United States Patent
Binder et al.

(10) Patent No.: US 10,814,898 B2
(45) Date of Patent: Oct. 27, 2020

(54) STEERING WHEEL ASSEMBLY

(71) Applicant: TAKATA AG, Aschaffenburg (DE)

(72) Inventors: Jens Binder, Berlin (DE); Udo Gaumann, Sulzbach (DE)

(73) Assignee: JOYSON SAFETY SYSTEMS GERMANY GMBH, Aschaffenburg (DE)

(*) Notice: Subject to any disclaimer, the term of this patent is extended or adjusted under 35 U.S.C. 154(b) by 457 days.

(21) Appl. No.: 15/566,681

(22) PCT Filed: Apr. 12, 2016

(86) PCT No.: PCT/EP2016/057991
§ 371 (c)(1),
(2) Date: Oct. 13, 2017

(87) PCT Pub. No.: WO2016/166090
PCT Pub. Date: Oct. 20, 2016

(65) Prior Publication Data
US 2019/0217881 A1     Jul. 18, 2019

(30) Foreign Application Priority Data
Apr. 14, 2015 (DE) .................. 10 2015 206 662

(51) Int. Cl.
*B62D 1/06* (2006.01)
*B62D 1/04* (2006.01)

(52) U.S. Cl.
CPC ............ *B62D 1/065* (2013.01); *B62D 1/046* (2013.01)

(58) Field of Classification Search
None
See application file for complete search history.

(56) References Cited

U.S. PATENT DOCUMENTS

| | | | |
|---|---|---|---|
| 8,278,602 B2* | 10/2012 | Yoneyama | B62D 1/065 219/204 |
| 2005/0239075 A1* | 10/2005 | Yanagidaira | A61B 5/0245 435/6.16 |
| 2011/0089160 A1* | 4/2011 | Kuriki | G06F 3/044 219/553 |
| 2012/0118868 A1 | 5/2012 | Kim et al. | |
| 2013/0160608 A1 | 6/2013 | Nusko et al. | |

(Continued)

FOREIGN PATENT DOCUMENTS

| | | |
|---|---|---|
| DE | 10 2010 017 706 A1 | 1/2012 |
| DE | 11 2010 003 312 T5 | 6/2012 |

(Continued)

OTHER PUBLICATIONS

Machine translation of DE-102012214752-A1, Feb. 2020.*
International Search Report dated Nov. 7, 2016 issued in PCT/EP2016/057991.

*Primary Examiner* — Geoffrey S Evans
(74) *Attorney, Agent, or Firm* — Gordon Rees Scully; Mansukhani, LLP (57) ABSTRACT

It is provided a steering-wheel assembly for a motor-vehicle steering wheel, comprising a gripping region for gripping and actuating a steering wheel, and at least one electrical element arranged on the gripping region. The at least one electrical element is formed by an electrical layer which contains an electrically non-conducting material as well as electrically conductive nanowire received therein.

20 Claims, 6 Drawing Sheets

(56) References Cited

U.S. PATENT DOCUMENTS

2013/0192412 A1\* 8/2013 Sekiya .................. B62D 1/065
 74/558
2014/0339211 A1\* 11/2014 Barfuss ................. B60N 2/002
 219/202
2017/0334477 A1\* 11/2017 Bossler ............... H03K 17/962

FOREIGN PATENT DOCUMENTS

| DE | 10 2012 214752 A1 | 2/2014 | | |
|----|-------------------|--------|---|---|
| DE | 102012214752 A1 \* | 2/2014 | ............ | B62D 1/065 |
| EP | 2 572 942 B1 | 1/2014 | | |

\* cited by examiner

STEERING WHEEL ASSEMBLY

CROSS-REFERENCE TO A RELATED APPLICATION

This application is a National Phase Patent Application of International Patent Application Number PCT/EP2016/057991, filed on Apr. 12, 2016, which claims priority of German Patent Application Number 10 2015 206 602.2.0, filed on Apr. 14, 2015.

BACKGROUND

The invention relates to a steering-wheel assembly for a motor-vehicle steering wheel.

A steering-wheel assembly of such a type comprises a gripping region for gripping and actuating the steering wheel, as well as at least one electrical element arranged on the gripping region. The gripping region may be, for example, a steering-wheel rim which via spokes is connected to the hub of a rotatably mounted steering wheel. An electrical element arranged on the gripping region may, on the one hand, be realized as an electrical heating element which generates heat when current is applied to it and, as a result, can serve for heating the gripping region. Alternatively or additionally, a detector device may be connected to at least one electrical element, in order to be able to detect—by measurement of a physical variable such as, for instance, a capacitance or a current flowing through the electrical element—a contact of the gripping region by the hand of a vehicle driver (which influences said physical variable of state).

From EP 2 572 942 B1 a capacitive sensing system is known which can be arranged on a motor-vehicle steering wheel and which uses an electrical heating element—for example, in the form of a heating wire arranged on the steering-wheel rim—as an antenna electrode. By application of a heating current in the form of a direct current to the heating element or heating wire, the heating element is heated up, in order to heat the steering-wheel rim. On the other hand, the heating element is connected to a (capacitive) detector, by means of which an alternating current can be applied to the heating element, and which generates an output signal indicating the capacitance of the heating element on the basis of the alternating current for which the detector exhibits a current-measuring arrangement. By this means, contacts of the steering-wheel rim by the hands of a vehicle driver can be registered.

In the case of steering wheels having a leather-covered steering-wheel rim, the heating element can be arranged in straightforward manner underneath the leather material—for example, by a heating mat, into which heating wires have been woven, being arranged between the leather material and the steering-wheel body (or, more precisely, the body of the steering-wheel rim) encompassed by the leather material. However, this procedure is not readily applicable to steering wheels in which the steering-wheel body, which is normally realized as a foamed body, is provided directly with a layer of lacquer for forming a design surface (doing without leather, wood or such like).

SUMMARY

The problem underlying the invention is to make available a steering-wheel assembly of the type mentioned in the introduction, on the gripping region of which the integration of a heating device and/or of means for registering a contact of the gripping region, also taking varying configurations of the outer design surface of the gripping region into consideration, is made possible in straightforward manner.

In accordance with the invention, this problem is solved by the creation of a steering-wheel assembly having features as described herein.

Accordingly, the at least one electrical element is formed by an electrical layer which contains an electrically non-conducting material as well as electrically conductive nanowire received therein. In this connection, "nanowire" is understood to mean a metallic or semiconducting wire with a cross-sectional dimension of at most 100 nanometers. In the case of the nanowire, in the present case it may be a question, in particular, of nanowire consisting of silver (silver nanowire).

Wires of such a type can be integrated into extremely thin layers, such as layers of lacquer for instance, without the nanowire becoming visible as a separate component, so that the design function of an appropriate layer—such as said layer of lacquer, for example—is not impaired.

The electrical layer that is formed from the electrically non-conducting material—such as a lacquering agent, for example—and from nanowire can consequently also be used, in particular, as the outer coating of the gripping region of a steering wheel. For this purpose it can, for example, be applied directly onto a foamed steering-wheel body, but alternatively also onto a leather covering or a wood trim or other decorative means which are arranged on the steering-wheel body. In this case, the electrical layer may be realized as a transparent (transparent to light) coating, in particular on the basis of a transparent lacquering agent.

The electrical layer may, on the one hand, serve as a heating layer, inasmuch as it is connected to a source of current or source of voltage via which the nanowire can have (direct or alternating) current applied to it. In this case, the nanowire is heated up for the purpose of heating the gripping region. By virtue of the fact that the generation of heat can take place directly on the outer surface of the gripping region and does not, for instance, have to take place—as known from the prior art—underneath a leather covering or a wood trim of the steering wheel, the surface of the steering wheel can be heated up to a desired temperature in a comparatively short time and also with a comparatively low power.

In addition to this, the electrical layer can be used in order to detect contacts of the gripping region of the steering-wheel assembly. This can be done by virtue of the fact that an evaluating unit, with which the change in a physical variable as a consequence of a contact of the corresponding electrical layer can be registered, is coupled to the electrical layer. For this purpose, the electrical capacitance, for instance, between two (separate) electrical elements of the electrical layer, which is influenced when the layer is contacted and is consequently suitable as a physical measured variable for detecting contacts of the gripping region, can be registered by means of the evaluating unit.

The at least one electrical element of the electrical layer may have been formed in the present case by virtue of the fact that in the non-conducting material of the layer a limited partial region contains a large number of nanowires which are in electrical contact with one another (inasmuch as they touch one another).

Consequently the nanowires form in the delimited partial region an electrical network which, in turn, defines overall an electrically conducting element. On this basis, in particular a plurality of electrical elements, which in each instance are separated from one another by regions of the non-conducting material and thereby electrically insulated from one another, may also be formed in the non-conducting material.

According to an embodiment of the invention, on the gripping region of the steering wheel at least one electrical element extends along the direction of extent thereof. In the case of a gripping region designed in conventional manner as a steering-wheel rim, this means that said electrical element extends along an arcuately curved direction of extent, corresponding to the course of the steering-wheel rim. In this case, in particular several electrical elements may extend side by side on the surface of the gripping region along the direction of extent thereof, which in each instance are electrically insulated from one another, inasmuch as the electrical elements are spaced from one another transversely with respect to the direction of extent, and non-conducting material is arranged in between them in each instance.

Such electrical elements extending in the direction of extent of the gripping region are suitable for heating the gripping region, inasmuch as they are connected to a source of current and act as a resistance heater when a current is applied.

Alternatively or additionally, on the gripping region at least one electrical element may also extend transversely (that is to say, obliquely or perpendicularly) to the direction of extent thereof. Also with this arrangement of electrical elements there may be provision that a plurality of electrical elements of such a type have been formed, spaced from one another, on the gripping region and are insulated from one another in each instance by intermediate regions of non-conducting material.

By means of a plurality of electrical elements extending transversely with respect to the direction of extent of the gripping region and, at the same time, spaced from one another along the direction of extent, contacts of the steering-wheel rim can be registered in locally resolved manner, inasmuch as the individual electrical elements extending transversely with respect to the direction of extent are connected in each instance to an evaluating unit, as a result of which it can be determined thereby on which of the electrical elements changes in capacitance (by approach of a hand) are occurring.

In order to be able both to heat the gripping region and to detect contacts of the gripping region in locally resolved manner, the electrical layer arranged on the surface of the gripping region may exhibit a grating of first and second electrical elements, the first electrical elements extending in each instance, for example, along the direction of extent of the gripping region, and the second electrical elements extending, for example, transversely thereto.

At the points of intersection the first and second electrical elements may be electrically insulated from one another in each instance, inasmuch as regions of the non-conducting material are present in between them in each instance. This can be obtained, for example, by the first electrical elements being firstly applied onto the gripping region, by these subsequently being covered with non-conducting material, and by the second electrical elements then being applied on the surface of the gripping region. These are, in turn, advantageously covered with a further layer of non-conducting material, in order to prevent the hands of a driver from being able to come into contact with the electrical elements.

BRIEF DESCRIPTION OF THE DRAWINGS

Further particulars and advantages of the invention will become clear in the following description of exemplary embodiments with reference to the figures.

DETAILED DESCRIPTION

Figure 6:
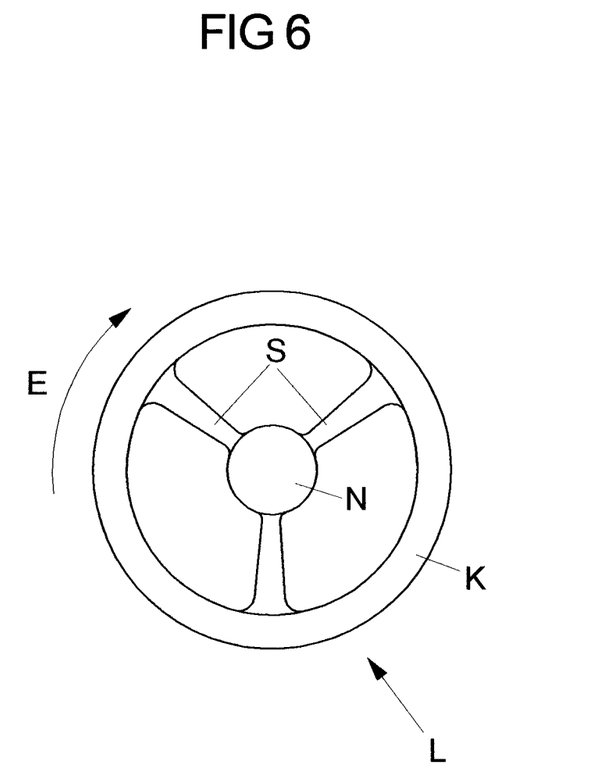
FIG. 6 a top view of a motor-vehicle steering wheel.

FIG. 6 shows a known structure of a motor-vehicle steering wheel L with a steering-wheel rim K which is connected to a hub N via spokes S. The steering-wheel rim K extends in annular manner along an (arcuately curved) direction of extent E and forms a gripping region on which a driver can grip the steering wheel L in order to steer an associated motor vehicle.

Figure 1:
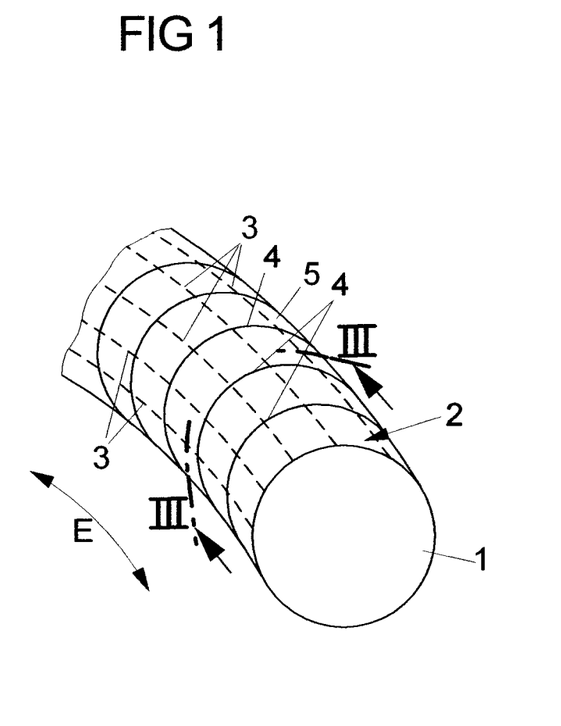
FIG. 1 a sector of a gripping region of a motor-vehicle steering wheel, specifically in the form of a steering-wheel rim.

Denoted by 1 in FIG. 1 is a sector of the gripping region or steering-wheel rim from FIG. 6, on which an electrical layer 2 has been applied by way of outermost layer. In this case the electrical layer 2 may, on the one hand, have been applied directly onto a basic body of the steering wheel or, more precisely, of the gripping region 1—that is to say, in the case of a foamed steering wheel, for instance directly onto the foamed gripping region 1, in order advantageously to form the outermost layer of the gripping region 1. Alternatively, the basic body of the steering wheel may have been provided with a trim—for example, made of plastic, leather and/or wood—in which case the electrical layer 2 has then advantageously been applied onto that trim.

Figure 4:
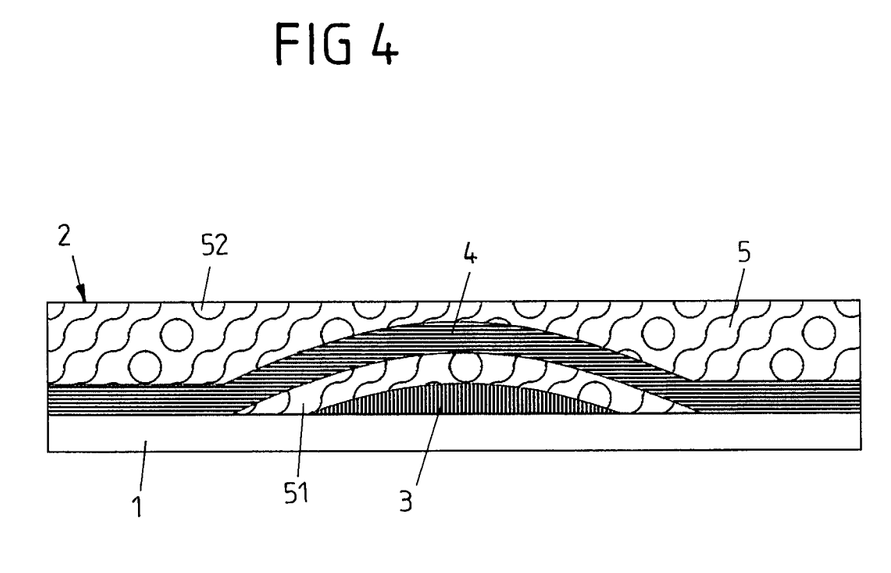
FIG. 4 a cross section through an electrical layer applied onto the gripping region.

The electrical layer 2 contains a non-conducting material 5, in particular in the form of a lacquer, within which electrical elements 3, 4 extend; compare also the cross-sectional representation of the electrical layer 2 in FIG. 4.

In the exemplary embodiment shown in FIGS. 1 and 4, several electrical elements 3 extend longitudinally along the direction of extent E of the gripping region 1 or of the steering-wheel rim K (compare FIG. 6) and are spaced from one another transversely with respect to the direction of extent E. Since the non-conducting material 5 of the electrical layer 2 is located in each instance between the individual electrical elements 3, the longitudinally extended electrical elements 3 are electrically insulated from one another.

Transversely with respect to those first electrically conducting elements 3, second electrically conducting elements 4 extend within the electrical layer 2 on the surface of the gripping region 1. These second electrically conducting elements encompass the gripping region 1, or specifically the steering-wheel rim K, in each instance transversely with respect to the direction of extent E thereof. The second electrical elements 4 may form closed or open rings.

The second electrical elements 4 are arranged in each instance spaced from one another along the direction of extent E of the gripping region 1 and are distributed (advantageously, equally spaced) over the gripping region. In particular, the entire gripping region 1 or, specifically, the steering-wheel rim K may accordingly have been provided with second electrical elements 4 arranged in succession along its (arcuately curved) direction of extent E and spaced from one another. According to FIG. 1, as a result the first and second electrical elements 3, 4 form a cross-grating on the surface of the gripping region 1.

By virtue of the arrangement of the second electrical elements 4 spaced along the direction of extent E, with non-conducting material 5 of the electrical layer 2 being located in each instance between the second electrical elements 4, the second electrical elements 4 are also electrically insulated from one another in each instance.

As becomes clear, in particular, with reference to FIG. 4, in addition the first and second electrical elements 3, 4 are also electrically insulated from one another in each instance. In the exemplary embodiment this is obtained by virtue of the fact that at the points of intersection of a respective first electrical element 3 with a respective second electrical element 4 these elements extend at varying height within the electrical layer 2. Specifically, the first and second electrical elements 3, 4 (in particular, at the points of intersection) are separated from one another in each instance by regions of the non-conducting material 5.

The latter can be obtained, according to FIG. 4, for example by virtue of the fact that the first electrical elements 3 extending along the direction of extent E of the gripping region 1 are firstly applied onto the surface of the gripping region 1. Subsequently, said elements are covered with a first sublayer 51 of the electrically non-conducting material 5, for example in the form of a lacquering agent. Then the second electrical elements 4 extending transversely with respect to the direction of extent E are applied on top. These electrical elements can then, in turn, be covered by a second sublayer 52 of the electrically non-conducting material 5. As a result, the first and second electrical elements 3, 4 are separated from one another in each instance by regions 51 of the non-conducting material 5 and are thereby electrically insulated from one another.

Figure 3:
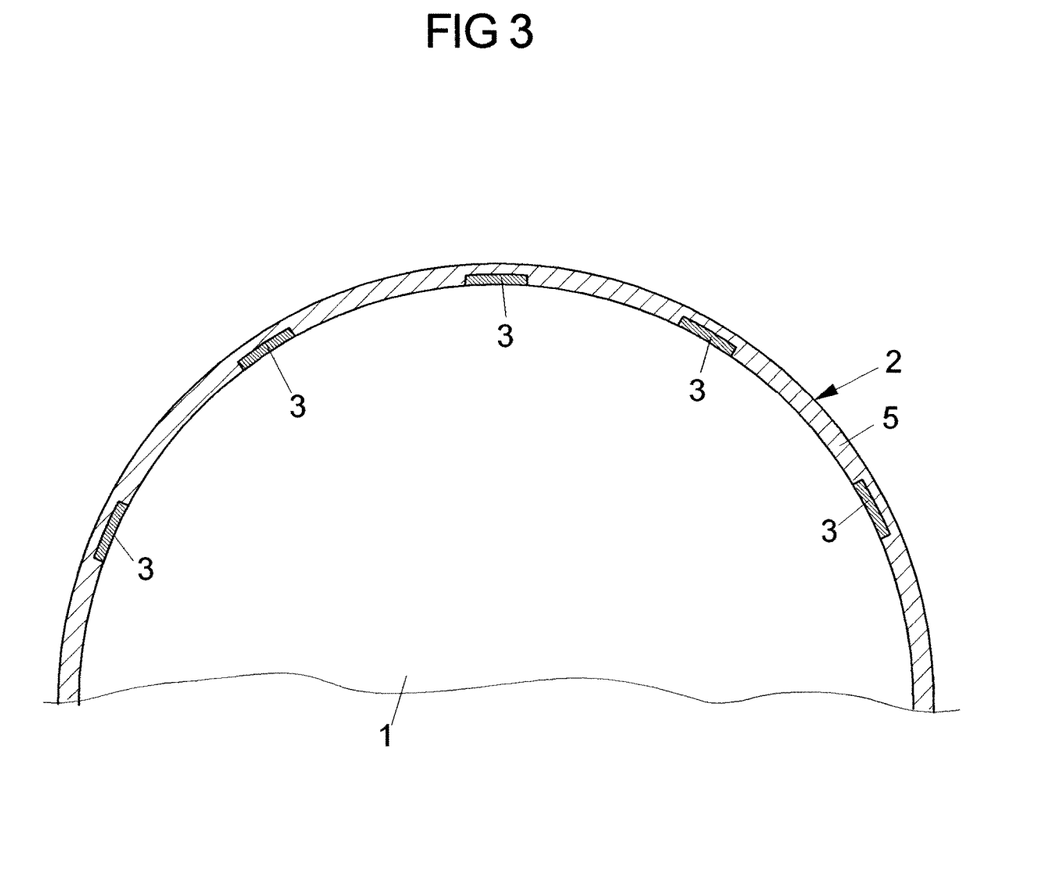
FIG. 3 a cross section through the gripping region from FIG. 1.

The arrangement of the first electrical elements 3 spaced from one another on the outer surface of the gripping region 1, covered by the non-conducting material 5, is illustrated once again with reference to the cross-sectional representation of the gripping region 1 in FIG. 3.

The width of the electrical elements 3, 4 (transversely with respect to their respective longitudinal extent) may amount, for example, to 1 mm to 10 mm. In the case of the first electrical elements 3, which extend along the direction of extent E of the gripping region 1 or the steering-wheel rim K, the length of the electrical elements may be, for example, one half of the circumference of the steering wheel (about 600 mm). (For the purpose of covering the entire gripping region 1 or steering-wheel rim K along the direction of extent E, in each instance two such electrical elements 3 may then have been arranged in succession along that direction E.) The second electrical elements 4, which encompass the gripping region 1 in each instance transversely with respect to the direction of extent E, have a maximum length that depends on the cross section of the gripping region 1 and may be, for example, 90 mm.

For the purpose of heating the gripping region 1, the first and/or the second electrical elements 3, 4 are coupled to a source of current. By this means, in known manner the gripping region 1 of the steering wheel can be heated up on its surface in the style of a resistance heater.

The detection of contacts of the gripping region 1 by the hand of a driver can be undertaken in the present case, in particular, by a capacitive method, for example a projected capacitive method. For this purpose, changes in capacitance, for example, between the first electrical elements 3 and the second electrical elements 4 when a hand has been applied are detected.

Figure 2:
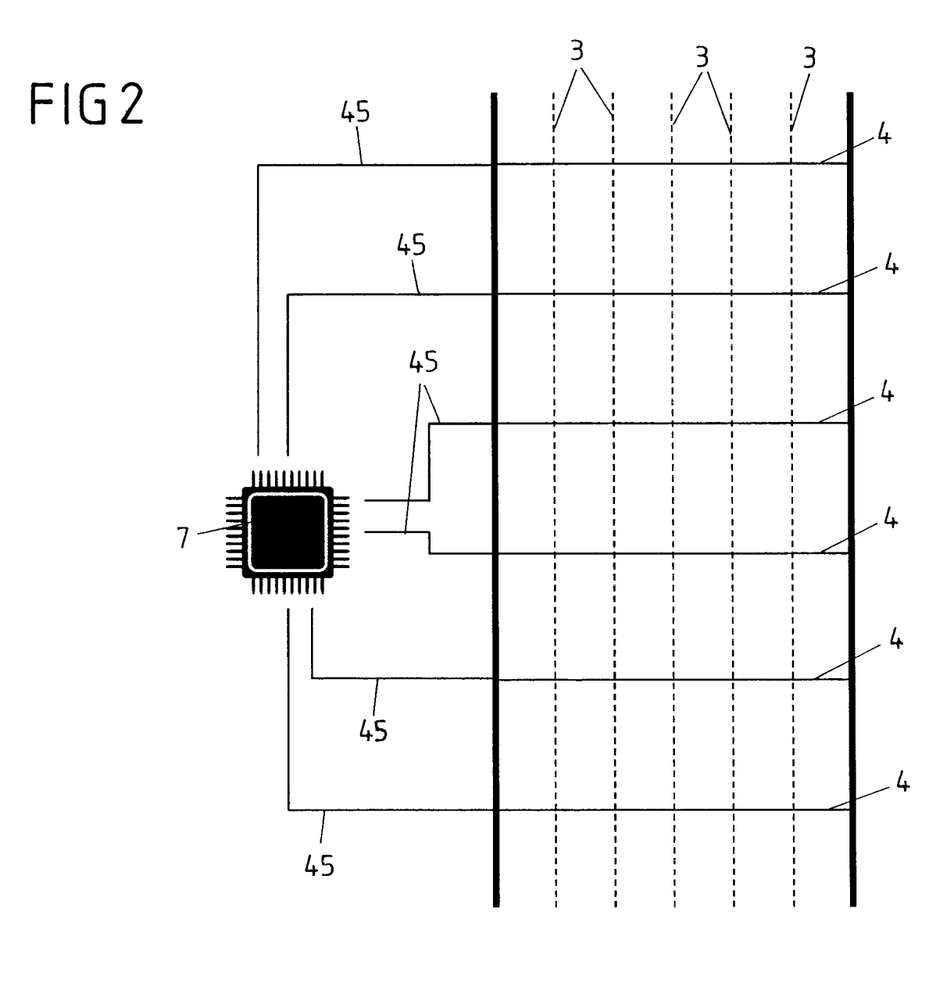
FIG. 2 a schematic top view of the sector from FIG. 1 together with an assigned evaluating unit.

As represented in FIG. 2, for this purpose the second electrical elements 4 (in each instance via assigned connecting lines 45) may have been connected to an evaluating unit 7. Since those second electrical elements 4 are arranged in succession along the direction of extent E of the gripping region 1, in particular in the form of a steering-wheel rim K, and are spaced from one another and electrically insulated from one another, by this means it is not only possible to ascertain whether a hand of the driver is resting on the gripping region 1; in addition to this, it is also possible to register at which location along the direction of extent E the contact of the gripping region 1 is taking place, inasmuch as it is established, by means of the evaluating unit 7, on which of the second electrical elements 4 changes in capacitance (in comparison with the first electrical elements 3) are present that have their origin in a contact of the gripping region 1.

Figure 5:
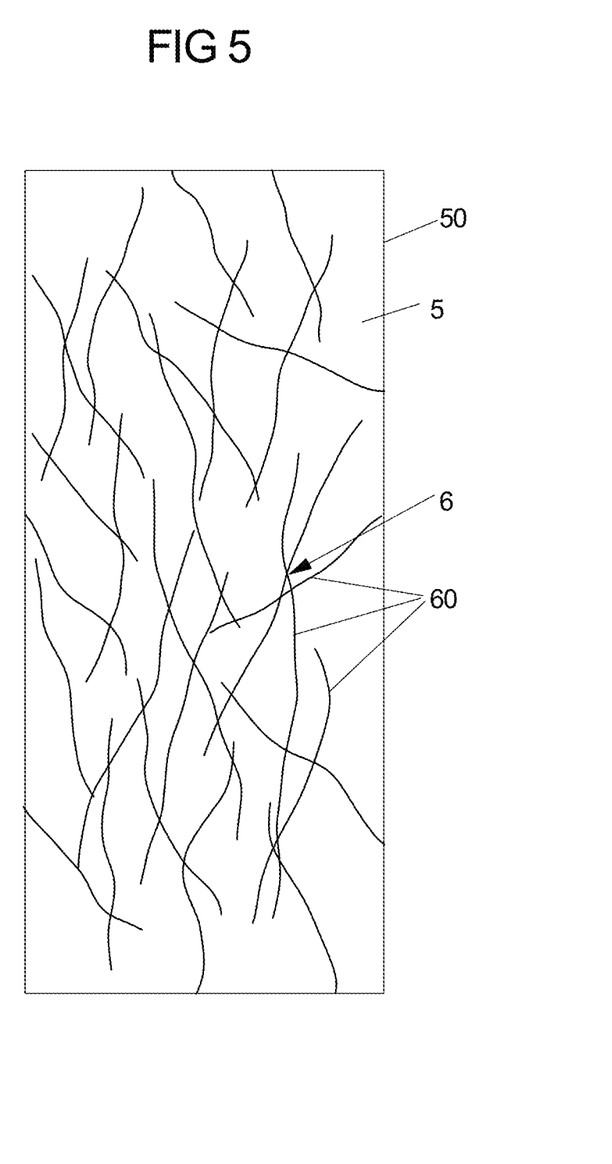
FIG. 5 a schematic representation of an electrically conducting element of the electrical layer from FIG. 4, formed by a network of nanowires.

According to FIG. 5, in the present case the electrical elements 3, 4 are formed in each instance by a network of nanowires consisting of an electrically conductive (for example, metallic or semiconducting) material, in particular in the form of silver nanowires. In this case it is a question of wires with a cross-sectional dimension of up to 100 nanometers.

As becomes clear with reference to FIG. 5, for the purpose of forming a respective electrical element 3, 4 a limited region 50 of the non-conducting material 5 (the dimension of which corresponds to the dimension of the electrical element to be formed) is provided with a large number of nanowires 60 which touch one another and as a result are in electrical contact with one another. By this means, a network of electrical nanowires 60 is formed which accordingly defines a respective electrically conducting element (3 or 4).

Inasmuch as the electrical elements 3, 4 are formed in each instance by a network of nanowires 60 with minimal cross-sectional dimension, the former are not visible even when they are received in an electrically non-conducting material 5 that is transparent to light. This makes it possible to apply an electrical layer 2 of the non-conducting material 5, in particular in the form of a lacquer, together with the electrical elements 3, 4 contained therein, formed by nanowire 6, directly on the outer surface (visible to occupants of the vehicle) of the gripping region 1 of a steering wheel without impairing the design thereof. By this means, the steering-wheel heater and the means for registering contacts of the gripping region 1 act directly on the outer surface thereof. In this way, a desired heating of the steering wheel can, for example, be obtained with comparatively lower heating currents than in the case of the conventional arrangement of a heating layer underneath a steering-wheel trim which may consist of leather or wood, for example. Furthermore, the heat becomes effective on the hands of the driver more quickly.

Furthermore, the non-conducting material 5 of the electrical layer 2 may also have been dyed for the purpose of achieving certain design effects.

The invention claimed is:

1. A steering-wheel assembly for a motor-vehicle steering wheel, comprising
a gripping region for gripping and actuating a steering wheel, and
at least one electrical element arranged on the gripping region,
wherein the at least one electrical element is formed by an electrical layer which contains an electrically non-conducting material as well as electrically conductive nanowire received therein wherein the at least one electrical element includes in the non-conducting material a delimited partial region that contains a large number of nanowires which are in electrical contact with one another, so that the delimited partial region with the nanowires contained therein forms an electrical network that is electrically conducting overall, wherein on the gripping region the at least one electrical element extends along a direction of extent of the gripping region, and/or the at least one electrical element extends transversely to the direction of extent of the gripping region.

2. The steering-wheel assembly as claimed in claim 1, wherein the at least one electrical layer is connected to a source of current, so that the nanowire contained in the electrical layer can carry a current for the purpose of generating heat.

3. The steering-wheel assembly as claimed in claim 1, further comprising an evaluating unit is connected to the at least one electrical layer, with which contacts of the gripping region are detected by measuring the change of a physical variable on the electrical layer, in particular by measuring a change in an electrical capacitance.

4. The steering-wheel assembly as claimed in claim 3, wherein on the gripping region several electrical elements, spaced from one another along the direction of extent of the gripping region and electrically insulated from one another, extend in each instance transversely with respect to the direction of extent thereof, wherein a respective electrical element extending transversely with respect to the direction of extent has been set up for detecting contacts of the gripping region and wherein the individual electrical elements extending transversely with respect to the direction of extent are connected in each instance to the evaluating unit, in order to be able to determine the location of contacts with the gripping region.

5. The steering-wheel assembly as claimed in claim 1, in the non-conducting material a plurality of electrically conducting elements are formed which in each instance are electrically insulated from one another by regions of the non-conducting material.

6. The steering-wheel assembly as claimed in claim 5, wherein on the gripping region several electrical elements, spaced from one another along the direction of extent of the gripping region and electrically insulated from one another, extend in each instance transversely with respect to the direction of extent of the gripping region.

7. The steering-wheel assembly as claimed in claim 5, wherein on the gripping region several electrical elements extend side by side along the direction of extent and are electrically insulated from one another.

8. The steering-wheel assembly as claimed in claim 1, wherein on the gripping region at least one electrical element extends along a direction of extent of the gripping region.

9. The steering-wheel assembly as claimed in claim 8, wherein a respective electrical element extending along the direction of extent of the gripping region has been set up for heating the gripping region.

10. The steering-wheel assembly as claimed in claim 8, wherein on the gripping region at least one electrical element extends transversely with respect to the direction of extent thereof and wherein on the gripping region electrical elements which extend along different directions intersect, intersecting electrical elements being separated from one another by regions of the non-conducting material and thereby electrically insulated from one another.

11. The steering-wheel assembly as claimed in claim 1, wherein on the gripping region at least one electrical element extends transversely with respect to the direction of extent thereof.

12. The steering-wheel assembly as claimed in claim 11, wherein a respective electrical element extending transversely with respect to the direction of extent has been set up for detecting contacts of the gripping region.

13. The steering-wheel assembly as claimed in claim 1, wherein the electrical layer forms an outermost layer of the gripping region, via which the gripping region borders the environment not pertaining to the motor-vehicle steering wheel.

14. The steering-wheel assembly as claimed in claim 13, wherein the electrical layer is insulated from the environment of the gripping region by exterior regions of the non-conducting material.

15. The steering-wheel assembly as claimed in claim 1, wherein the non-conducting material of the electrical layer is transparent to light.

16. The steering-wheel assembly as claimed in claim 1, wherein the non-conducting material of the electrical layer is a lacquering agent.

17. The steering-wheel assembly as claimed in claim 1, wherein the electrical layer is applied directly onto a foamed body of the gripping region.

18. The steering-wheel assembly as claimed in claim 1, wherein the gripping region is realized as an annularly circumferential steering-wheel rim.

19. A motor-vehicle steering wheel with a steering-wheel body and with a steering-wheel assembly according to claim 1, provided on the steering-wheel body.

20. The steering-wheel assembly as claimed in claim 1, wherein the electrical layer is applied directly on a trim covering a body of the gripping region.

* * * * *